United States Patent
Shiraishi et al.

(10) Patent No.: US 7,650,223 B2
(45) Date of Patent: Jan. 19, 2010

(54) METHOD AND DEVICE FOR INTEGRATIVE CONTROL OF GAS ENGINE

(75) Inventors: Masataka Shiraishi, Kanagawa-Ken (JP); Yoshitaka Kakuhama, Kanagawa-Ken (JP); Kei Sakai, Kanagawa-Ken (JP); Yosuke Kitamura, Kanagawa-Ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/230,450

(22) Filed: Aug. 28, 2008

(65) Prior Publication Data

US 2009/0076709 A1 Mar. 19, 2009

(30) Foreign Application Priority Data

Aug. 30, 2007 (JP) ............................. 2007-224667

(51) Int. Cl.
*B60T 7/12* (2006.01)
*F02D 31/00* (2006.01)

(52) U.S. Cl. ..................... 701/103; 701/110; 123/376; 123/391; 123/435

(58) Field of Classification Search ................. 701/103, 701/110, 114, 115; 123/361, 376, 391, 295, 123/674, 434, 435
See application file for complete search history.

(56) References Cited

U.S. PATENT DOCUMENTS

| | | | | |
|---|---|---|---|---|
| 5,657,736 A | * | 8/1997 | Maki et al. ................. | 123/673 |
| 5,755,094 A | * | 5/1998 | Maki et al. ................. | 60/276 |
| 5,758,308 A | * | 5/1998 | Maki et al. ................. | 701/104 |
| 5,806,012 A | * | 9/1998 | Maki et al. ................. | 701/104 |
| 5,867,983 A | * | 2/1999 | Otani ......................... | 60/276 |
| 6,234,156 B1 | * | 5/2001 | Muto ......................... | 123/698 |
| 7,320,307 B2 | * | 1/2008 | Trask et al. ................. | 123/435 |
| 2007/0056560 A1 | * | 3/2007 | Trask et al. ................. | 123/435 |
| 2007/0234984 A1 | * | 10/2007 | Kolmanovsky et al. .. | 123/90.15 |

FOREIGN PATENT DOCUMENTS

| JP | 5-141298 A | 6/1993 |
|---|---|---|
| JP | 2003-262139 A | 9/2003 |

* cited by examiner

*Primary Examiner*—John T Kwon
(74) *Attorney, Agent, or Firm*—Birch, Stewart, Kolasch & Birch LLP

(57) ABSTRACT

An integrative control method and device for controlling gas engines is proposed which load responsivity of the engine is improved while maintaining air fuel ratio control and stable control is performed when fuel gas of different calorific value is used. The control method comprises a speed control process for controlling engine rotation speed by controlling the fuel gas flow control valve based on deviation of actual engine rotation speed from a target command value of rotation speed, and an air fuel ratio control process for controlling air fuel ratio of fuel-air mixture by controlling throttle valve opening based on deviation of the actual mixture flow rate from the command value of mixture flow rate, whereby correction of theoretical air fuel ratio in accordance with exhaust temperature is performed in the air fuel ratio control process, the correction being done to correct the theoretical air fuel ratio used to calculate the command value of fuel-air mixture flow rate in accordance with exhaust temperature based on deviation of actual exhaust temperature from target exhaust temperature prescribed for various engine rotation speeds and load factors.

9 Claims, 6 Drawing Sheets

FIG. 4

Fuel gas flow limit map

| | MAP [%] | | | | | |
|---|---|---|---|---|---|---|
| Engine rotation speed [min-1] | | 0 | 20 | 30 | 40 | 50 | ... |
| | 0 | 5 | 5 | 5 | 5.89 | 6.37 | |
| | 250 | 5 | 5 | 5 | 5.89 | 6.37 | |
| | 500 | 5 | 5.08 | 5.08 | 6.02 | 6.02 | |
| | 750 | 5.20 | 6.35 | 7.59 | 7.59 | 7.59 | |
| | 1000 | 5.62 | 6.98 | 8.13 | 8.13 | 8.13 | |
| | 1100 | 5.81 | 7.12 | 8.46 | 9.89 | 9.89 | |
| | 1200 | 6.15 | 7.85 | 9.24 | 10.04 | 10.04 | |
| | ... | | | | | | |

FIG. 5

Excess fuel ratio map

| | MAP [%] | | | | | |
|---|---|---|---|---|---|---|
| Engine rotation spped [min-1] | | 0 | 10 | 20 | 30 | 40 | ... |
| | 0 | 0.800 | 0.800 | 0.800 | 0.800 | 0.800 | |
| | 300 | 1.100 | 1.100 | 1.100 | 1.100 | 1.000 | |
| | 500 | 1.120 | 1.120 | 1.120 | 1.120 | 1.120 | |
| | 750 | 1.350 | 1.350 | 1.350 | 1.250 | 1.350 | |
| | 1000 | 1.350 | 1.350 | 1.350 | 1.350 | 1.350 | |
| | 1100 | 1.420 | 1.420 | 8.46 | 9.89 | 1.420 | |
| | 1200 | 1.520 | 1.520 | 1.520 | 1.520 | 1.520 | |
| | ... | | | | | | |

FIG. 6

|  |  | MAP [%] | | | | | |
|---|---|---|---|---|---|---|---|
|  |  | 0 | 10 | 20 | 30 | 40 | ... |
| Engine rotation speed [min-1] | 0 | 0.800 | 0.800 | 0.800 | 0.800 | 0.800 |  |
|  | 300 | 1.100 | 1.100 | 1.100 | 1.100 | 1.000 |  |
|  | 500 | 1.120 | 1.120 | 1.120 | 1.120 | 1.120 |  |
|  | 750 | 1.350 | 1.350 | 1.350 | 1.250 | 1.350 |  |
|  | 1000 | 1.520 | 1.520 | 1.520 | 1.520 | 1.520 |  |
|  | 1100 | 1.520 | 1.520 | 1.520 | 1.520 | 1.520 |  |
|  | 1200 | 1.650 | 1.650 | 1.650 | 1.680 | 1.720 |  |
|  | ... |  |  |  |  |  |  |

METHOD AND DEVICE FOR INTEGRATIVE CONTROL OF GAS ENGINE

BACKGROUND OF THE INVENTION

1. Field of the Invention

The present invention will be applied to a gas engine in which fuel gas introduced via a fuel supply pipe is mixed with air introduced via a charging air supply pipe and this mixture is supplied via a fuel-air mixture supply pipe to a combustion chamber of the engine. The invention relates to a method and device for performing integrative control of a gas engine equipped with a fuel gas flow control valve to its fuel gas supply pipe to control fuel gas flow and a throttle valve to its fuel-air mixture supply pipe to control fuel-air mixture flow, specifically those of a gas engine equipped with an electronic control unit for performing integrative control of engine rotation speed and air fuel ratio by means of the valves.

2. Description of the Related Art

Gas engines are internal combustion engines which use as fuel gaseous fuel such as natural gas. They can output high driving power with high efficiency, and widely adopted as engines for driving generators in normal and emergency service, engines for construction equipment, engines for ships, and engines for railroad vehicles. Besides, gas engines are used not only to drive generators for supplying electric power, but waste heat thereof is utilized as heat source for heating water, so they are superior in efficiency in energy use.

In a gas engine, fuel gas is supplied via a mixer into air introduced through a charging air supply pipe, fuel-air mixture consisting of the air and the fuel gas is supplied into a combustion chamber of the engine through an fuel-air mixture supply pipe, and driving power is generated by combustion of the fuel-air mixture in the combustion chamber.

In FIG. 7 is shown a conventionally prevalent gas engine. Here is shown as an example a turbocharged gas engine 1 having a subsidiary chamber for ignition.

As shown in the drawing, charging air flows through an air supply pipe 10 to a gas mixer 12, fuel gas flows through a fuel gas pipe 13, 14 to the gas mixer 12 via a main-chamber regulator 15 where air pressure is regulated and then via a main chamber fuel flow control valve 16 where fuel flow is controlled. The charging air and fuel gas are mixed in the mixer 12 to produce lean fuel-air mixture. The lean mixture is compressed by a compressor 26 of a turbocharger 25, then introduced into a main combustion chamber 7 in the suction stroke through a fuel-air mixture supply pipe 20 to be burned there after compressed in compression stroke. The burnt gas flows out from the combustion chamber 7 and is introduced as exhaust gas through an exhaust pipe 28 to a turbine 27 of the turbocharger 25. The exhaust gas drives the turbine and is exhausted outside.

On the other hand, a part of the fuel gas (subsidiary chamber fuel gas) introduced through the fuel gas pipe 13 is introduced through a subsidiary fuel gas pipe 21 branching from the fuel gas pipe 13 to a subsidiary-chamber regulator 23 where the fuel gas is regulated in pressure, then the fuel gas is introduced into a subsidiary chamber 8 provided in a cylinder head 3 of the engine 1 to be ignited by a spark of an ignition plug located at an upper position of the subsidiary chamber 8 near the top dead center of the engine cycle. The flame produced by the ignition of the fuel gas in the subsidiary chamber jets out to the main combustion chamber 7 to ignite the fuel-air mixture in the main combustion chamber.

It is necessary in the gas engine like this to control air fuel ratio in accordance with characteristics of fuel gas such as calorific value thereof in order to maintain optimum combustion evading occurrence of knocking and misfire and to reduce emission of harmful matter.

Conventionally, fuel-air mixture is controlled by the fuel flow control valve 16 to be a prescribed air fuel ratio with which normal combustion and reasonable exhaust gas property are maintained, and the fuel-air mixture of the prescribed air fuel ratio is supplied through the fuel-air mixture supply pipe 20 to the main combustion chamber 7 of the gas engine 1.

On the other hand, control of engine rotation speed is needed in order to maintain constant rotation speed in spite of changes in load. Engine speed control has been performed through controlling the flow rate of the fuel-air mixture of prescribed air fuel ratio supplied to the main combustion chamber 7 by controlling the opening of a throttle valve 18.

Conventionally, a fuel-air mixture control method consisting of air fuel ratio control and engine speed control as mentioned above has been widely adopted.

There is known another air fuel ratio control method of gas engine as disclosed in document 1(Japanese Laid-Open Patent Application NO. 5-141298). According to the disclosure, an oxygen sensor is attached to the exhaust pipe of the gas engine, and whether the fuel-air mixture supplied to the gas engine is rich or lean mixture is detected based on oxygen concentration of the exhaust gas detected by the oxygen sensor, and the air fuel ratio of the fuel-air mixture is controlled based on the result of the detection.

A further air fuel ratio control method of gas engines is disclosed in document 2(Japanese Laid-Open Patent Application NO. 2003-262139). According to the disclosure, air compressed by the compressor of the turbocharger is introduced through an air supply path to fuel injection devices each being provided for each of a plurality of cylinders, on the other hand, fuel gas is introduced through a fuel supply path to the fuel injection devices, and fuel-air mixture mixed in each fuel injection device is supplied to each cylinder. With this control method, necessary air flow is calculated based on detected fuel flow in the fuel supply path, actual air flow is calculated based on detected air pressure and temperature in the air supply path, and air flow in the air supply path is controlled so that actual air flow coincides with calculated air flow.

However, there has been a disadvantage that response to change of load is slow with the conventional fuel-air mixture control method as mentioned above, although it has an advantage of easiness of controlling air fuel ratio. Particularly, response when load is applied or shut off is slow, and improvement in response to load change has been demanded in order to attain high performance of gas engines. There is as one of problems of responsivity a disadvantage that, even if fine control is carried out to stabilize engine speed, stabilization of engine speed is difficult because of slow responsivity. In a case of a turbocharged gas engine, there occurs turbo lag (delay in response due to rotatory inertia of rotating components of the turbocharger), and responsivity is further reduced.

As a method of controlling engine speed with rapid response, there is known a method of controlling fuel gas flow to accommodate changes of load. However, with this conventional method, control of air fuel ratio is difficult, and stable combustion control cannot be achieved. As it is difficult to keep air fuel ratio in an appropriate range, there occurs a problem of compliance with exhaust emission regulation. Moreover, as fuel flow can not be detected quantitatively with the conventionally prevalent fuel gas flow control method of controlling the opening of the fuel flow control valve, over run or overload of engine due to excessive supply of fuel is apt to occur. Particularly, engine stall or abnormal combustion is apt to occur at application or rejection of load because of difficulty of accurate control of air fuel ratio when applying or shutting off load.

Furthermore, in the conventional fuel-air mixture control method, it is required to have leeway in supercharging pressure in order to secure ample engine output, and decrease in thermal efficiency is unavoidable due to pumping loss caused by throttling the mixture inlet passage to the main combustion chamber. On the other hand, with the fuel gas flow control method, the engine is immune from the problem of output shortage due to increased pumping loss, however, it is difficult to keep air fuel ratio in an appropriate range and comply with exhaust emission regulation.

With air fuel ratio control using a signal from the oxygen sensor as a feedback signal as recited in the document 1, manufacturing cost will be increased due to expansive oxygen sensor.

On the other hand, the gas engine recited in the document 2 is provided with fuel injection devices and fuel flow control valves for each of a plurality of cylinders respectively, and different from the gas engine of this patent application in basic configuration. The configuration of the gas engine of the document 1 is suited for a large engine and difficult to adopt for a small engine. Besides, as a part of air supplied from the compressor is released to outside through the air release valve to control air quantity charged into the combustion chamber, efficiency of the engine is reduced, and a larger compressor is required.

Fuel gases used for gas engines range over many kinds of gases such as natural gas, propane gas, sludge digestion gas, etc. Calorific value of each of these gases is different depending on their constituents and exerts a significant influence on air fuel ratio control. There has been a problem that mismatched control occurs such as engine output shortage due to mismatched air fuel ratio and inability of engine starting by the conventional method of mixture control with air fuel ratio maintained constant.

Furthermore, with the conventional control method, air fuel ratio control and engine speed control are performed by separate control devices respectively, however, there is a disadvantage that manufacturing cost increases since the control devices are expensive, and in addition, to assure coordinated behavior of each device is difficult, which makes smooth control of the engine difficult.

SUMMARY OF THE INVENTION

The present invention was made in light of problems of prior arts, and the object of the invention is to provide a method and device for integrative control of a gas engine with which smooth and sophisticated control of engine operation is made possible by uniting air fuel ratio control and speed control so that coordinated control of the engine is performed under cooperation of the speed control air fuel ratio control, load responsivity is improved while maintaining accurate air fuel ratio control, and stable control can be performed even when fuel gas of different calorific value is used.

To attain the object, the invention proposes an integrative control method of a gas engine in which fuel gas is introduced via a fuel gas flow control valve to a charging air supply pipe to be mixed with the air and the mixture is controlled in its flow rate by a throttle valve and supplied to combustion chambers and the gas burnt in the combustion chamber is exhausted through an exhaust pipe of the engine, comprising a speed control process for controlling engine rotation speed by calculating a command value of fuel gas flow rate based on deviation of a detected engine rotation speed from a target command value of engine rotation speed and controlling fuel gas flow rate flowing through the fuel gas flow control valve to coincide with the calculated command value of fuel gas flow rate, and an air fuel ratio control process for controlling air fuel ratio of fuel-air mixture supplied to the combustion chamber of the engine through performing feedback control in which such a command value of fuel-air mixture flow rate is calculated that air fuel ratio of the mixture coincides with an adequate value prescribed for each of detected values of operating conditions of the gas engine with the fuel gas flow flowing at the commanded fuel gas flow rate and a target opening of the throttle valve is determined based on deviation of the actual mixture flow rate calculated based on detected values of operating conditions of the gas engine from the calculated command value of fuel-air mixture flow rate, wherein correction of theoretical air fuel ratio in accordance with exhaust temperature is performed in the air fuel ratio control process, the correction being done to correct the theoretical air fuel ratio used to calculate the command value of fuel-air mixture flow rate in accordance with exhaust temperature based on deviation of actual exhaust temperature from target exhaust temperature prescribed for various engine rotation speeds and load factors.

According to the invention, flow rate of fuel gas supplied to the combustion chamber is increased or decreased by directly controlling the fuel gas flow control valve, so responsivity of the control is rapid and stable speed control is possible. Moreover, throttle valve opening is controlled to control mixture flow rate with air fuel ratio controlled to an appropriate air fuel ratio taking the fuel gas flow rate into consideration. Therefore, improvement in responsivity to load change and stable speed control can be achieved with accurate air fuel ratio control maintained. Particularly, load responsivity at load application or load rejection can be improved dramatically.

Although the throttle valve is used in the invention for mixture flow control, air fuel ratio can be controlled based on detected values of pressure and temperature of the engine, so pumping loss, i.e. throttle loss can be reduced to a minimum by balancing advantages of mixture flow control and fuel gas flow control. Furthermore, as air fuel ratio control can be achieved with accuracy by controlling the fuel gas flow control valve and mixture control valve (throttle valve), an expensive exhaust gas sensor (oxygen sensor) is not needed and the device can be manufactures at a moderate cost.

According to the invention, correction of theoretical air fuel ratio is performed in accordance with exhaust gas temperature based on deviation of detected exhaust gas temperature from target exhaust gas temperature, so appropriate air fuel ratio control is made possible even when fuel gas of different calorific value is used, and occurrence of output shortage and inability of starting of the engine can be prevented.

The invention is characterized in that limit ranges of fuel gas flow rates including at least upper limit of fuel gas flow rates are prescribed based on permissible endurance of the gas engine or limit ranges of excess air ratios including at least lower limit of excess air ratios are prescribed based on permissible air fuel ratio for preventing abnormal combustion for various engine speed and load, and limit control is performed so that the command value of fuel gas flow rate does not exceed the limit range for concerned engine speed and load in the speed control section.

According to the invention, quantitative limitation of fuel gas supply for various engine operation conditions can be performed, and limit values having physical meaning for the engine can be set. More specifically, by setting limit ranges for various engine operating conditions based on appropriate air fuel ratio of mixture, mixture can be supplied in a range of appropriate air fuel ratio, so occurrence of misfire abnormal combustion can be prevented. On the other hand, by setting limit ranges for various engine operating conditions based on permissible endurance of the engine, the engine can be operated within permissible ranges of output depending on operation conditions from a viewpoint of durability of the engine, so occurrence of trouble and abnormal deterioration of the engine can be prevented.

The invention is characterized in that the target exhaust temperature is corrected based on other temperatures such as temperature of cooling water, mixture inlet, and lube oil in the correction process of theoretical fuel air ratio in accordance with exhaust temperature. By correcting the target exhaust temperature obtained from the target exhaust temperature map in this way, corrected target exhaust temperature can be obtained which is more consistent with combustion condition of actual fuel gas.

The invention is characterized in that average exhaust temperature of all cylinders is calculated, detected temperature of exhaust gas from each cylinder is compared with the average temperature respectively to obtain deviation from the average temperature, and when there is (are) a cylinder(s) of which the deviation exceeds a predetermined threshold value, partial average exhaust temperature is calculated excluding the exhaust temperature(s) from the concerned cylinder(s) to obtain exhaust temperature to be used as the actual exhaust temperature in the correction process of theoretical air fuel ratio in accordance with exhaust temperature.

According to the invention, by discovering a cylinder of which exhaust temperature is abnormal and correcting theoretical air fuel ratio using average exhaust temperature excluding the abnormal exhaust temperature as the actual exhaust temperature, proper correction of theoretical air fuel ratio in accordance with exhaust temperature can be performed even when misfire occurs in any of the cylinders or exhaust temperature of any of the cylinders is not detected.

The invention proposes an integrative control device of a gas engine in which fuel gas is introduced via a fuel gas flow control valve to a charging air supply pipe to be mixed with the air and the mixture is controlled in its flow rate by a throttle valve and supplied to combustion chambers of the engine, the engine being equipped with a rotation speed sensor for detecting engine rotation speed, a inlet pressure sensor for detecting inlet mixture pressure, an inlet temperature sensor for detecting inlet mixture temperature, an exhaust temperature sensor for detecting temperature of exhaust gas from the cylinder, and a control device which performs engine control based on input signals from the sensors, wherein the control device comprises a speed control section for controlling engine rotation speed by calculating a command value of fuel gas flow rate based on deviation of a detected engine rotation speed from a target command value of engine rotation speed and controlling fuel gas flow rate flowing through the fuel gas flow control valve to coincide with the calculated command value of fuel gas flow rate, and an air fuel ratio control section for controlling air fuel ratio of fuel-air mixture supplied to the combustion chamber of the engine through performing feedback control in which such a command value of fuel-air mixture flow rate is calculated that air fuel ratio of the mixture coincides with an adequate value prescribed for each of detected values of operating conditions of the gas engine with the fuel gas flow flowing at the commanded fuel gas flow rate and a target opening of the throttle valve is determined based on deviation of the actual mixture flow rate calculated based on detected engine rotation speed, inlet manifold pressure, and inlet manifold temperature from the calculated command value of fuel-air mixture flow rate, wherein a means for correcting theoretical air fuel ratio in accordance with exhaust temperature is provided in the air fuel ratio control section, the correction being done to correct the theoretical air fuel ratio used to calculate the command value of fuel-air mixture flow rate in accordance with exhaust temperature based on deviation of actual exhaust temperature from target exhaust temperature prescribed for various engine rotation speeds and load factors.

Moreover, the invention is characterize in that the means for correcting theoretical air fuel ratio in accordance with exhaust temperature is provided with a map in which target temperatures are prescribed for various engine rotation speeds and load factors, and target exhaust temperature is obtained from the map in accordance with the detected engine rotation speed and load factor calculated based on the engine rotation speed and command value of fuel gas flow calculated in the speed control section.

Furthermore, the invention is characterize in that limit ranges of fuel gas flow rates including at least upper limit of fuel gas flow rates are prescribed based on permissible endurance of the gas engine or limit ranges of excess air ratios including at least lower limit of excess air ratios are prescribed based on permissible air fuel ratio for preventing abnormal combustion for various engine speed and load, and limit control is performed so that the command value of fuel gas flow rate does not exceed the limit range for concerned engine speed and load in the speed control section.

Furthermore, the invention is characterize in that the means for correcting theoretical air fuel ratio in accordance with exhaust temperature is provided with a means for correcting the target exhaust temperature based on other temperatures such as temperature of cooling water, mixture inlet, and lube oil.

Furthermore, the invention is characterize in that the means for correcting theoretical air fuel ratio in accordance with exhaust temperature is provided with a means for calculating average exhaust temperature of all cylinders, comparing detected temperature of exhaust gas from each cylinder with the average temperature respectively to obtain deviation from the average temperature, and calculating partial average exhaust temperature excluding the exhaust temperature(s) of which the deviation from the average exhaust temperature of all cylinders exceeds a predetermined threshold value, the partial average exhaust temperature being used as the actual exhaust temperature to correct theoretical air fuel ratio in accordance with exhaust temperature.

As has been described in the forgoing, according to the control method, flow rate of fuel gas supplied to the combustion chamber is increased or decreased by directly controlling the fuel gas flow control valve, so responsivity of the control is rapid and stable speed control is possible. Moreover, throttle valve opening is controlled to control mixture flow rate with air fuel ratio controlled to an appropriate air fuel ratio taking the fuel gas flow rate into consideration. Therefore, improvement in responsivity to load change and stable speed control can be achieved with accurate air fuel ratio control maintained. Particularly, load responsivity at load application or load rejection can be improved dramatically.

Moreover, by composing the apparatus such that the speed control section and air fuel ratio control section are unified in the control device so that coordinated control of the engine is performed under cooperation of the speed control section and air fuel ratio control section, smooth and accurate control of engine operation is made possible without requiring a plurality of expensive control devices. In addition, an expensive exhaust gas sensor is not needed to provide, so significant cost reduction is made possible.

Furthermore, by performing limit control in the speed control section, quantitative limitation of fuel gas flow in various operating conditions is possible, and limit value having physical meaning for the gas engine can be applied as control limits for the engine. That is, by determining limit ranges of fuel gas flow based on permissible endurance or ruggedness of the gas engine 1, operation is controlled in a range of output permissible for the engine from a viewpoint of durability of the engine, so occurrence of trouble or abnormal deterioration of the engine can be prevented. On the other hand, by determining limit ranges of air fuel ratio (excess air ratio), fuel-air mixture of appropriate air fuel ratio can be supplied to the combustion chamber, occurrence of misfire or abnormal deterioration of the engine can be prevented.

Furthermore, according to the invention, theoretical air fuel ratio used to calculate demand value of mixture flow rate is corrected based on deviation of the actual exhaust temperature from the target exhaust temperature, so air fuel ratio can be controlled appropriately even when fuel gas of different calorific value is used, and occurrence of output shortage and inability of starting can be prevented.

Furthermore, by correcting the target exhaust temperature obtained from the target exhaust temperature map, corrected target exhaust temperature can be obtained which is more consistent with combustion condition of actual fuel gas.

Furthermore, by discovering a cylinder of which exhaust temperature is abnormal and correcting theoretical air fuel ratio using average exhaust temperature excluding the abnormal exhaust temperature as the actual exhaust temperature, proper correction of theoretical air fuel ratio in accordance with exhaust temperature can be performed even when misfire occurs in any of the cylinders or exhaust temperature of any of the cylinders is not detected.

BRIEF DESCRIPTION OF THE DRAWINGS

FIG. 4 is a table showing an example of limit fuel gas flow map.

FIG. 5 is a table showing an example of limit excess air ratio map.

FIG. 6 is a table showing an example of adequate excess air ratio map.

DETAILED DESCRIPTION OF THE PREFERRED EMBODIMENTS

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 1:
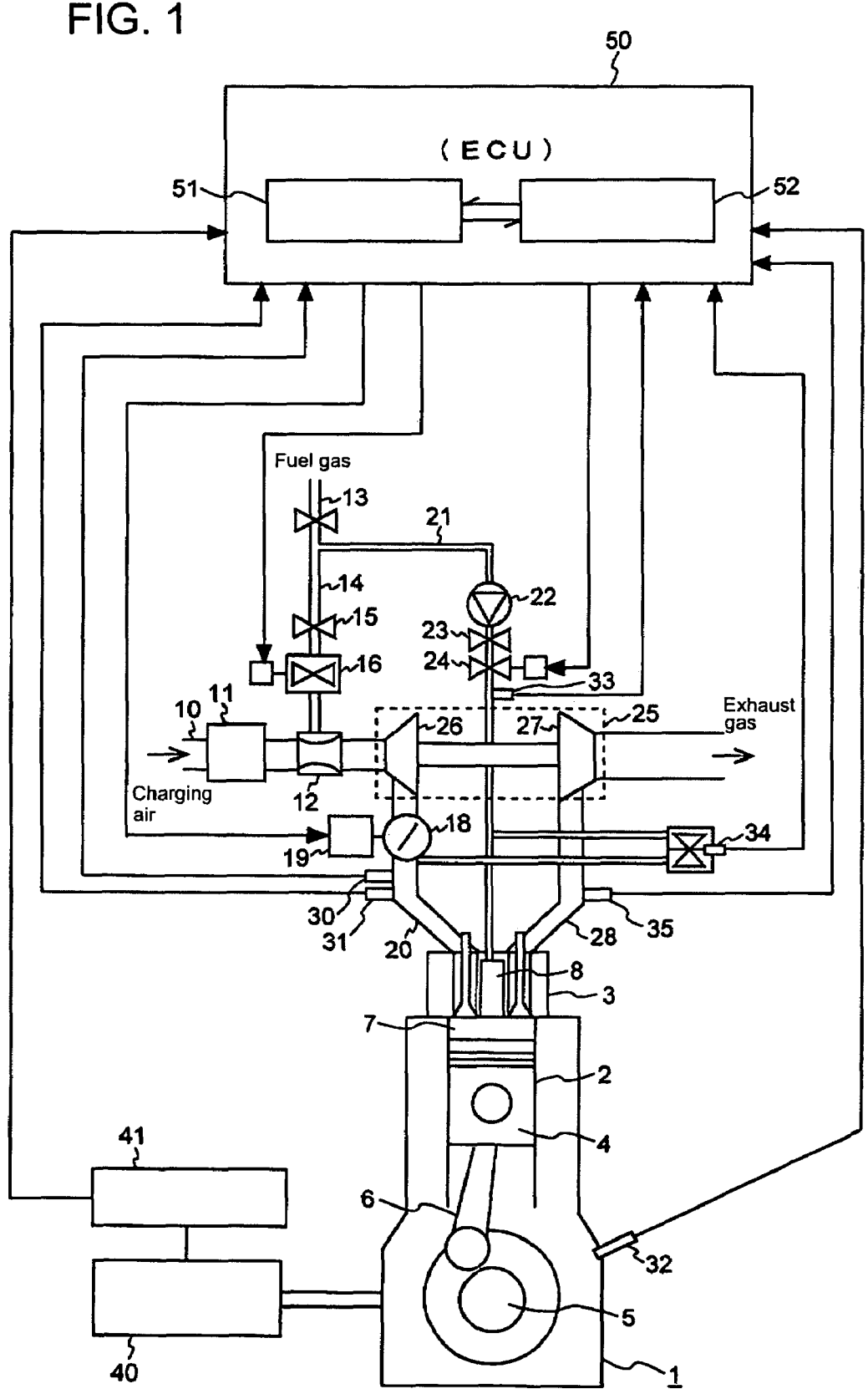
FIG. 1 is an overall configuration of an embodiment of the control device according to the invention including the gas engine.
Figure 2:
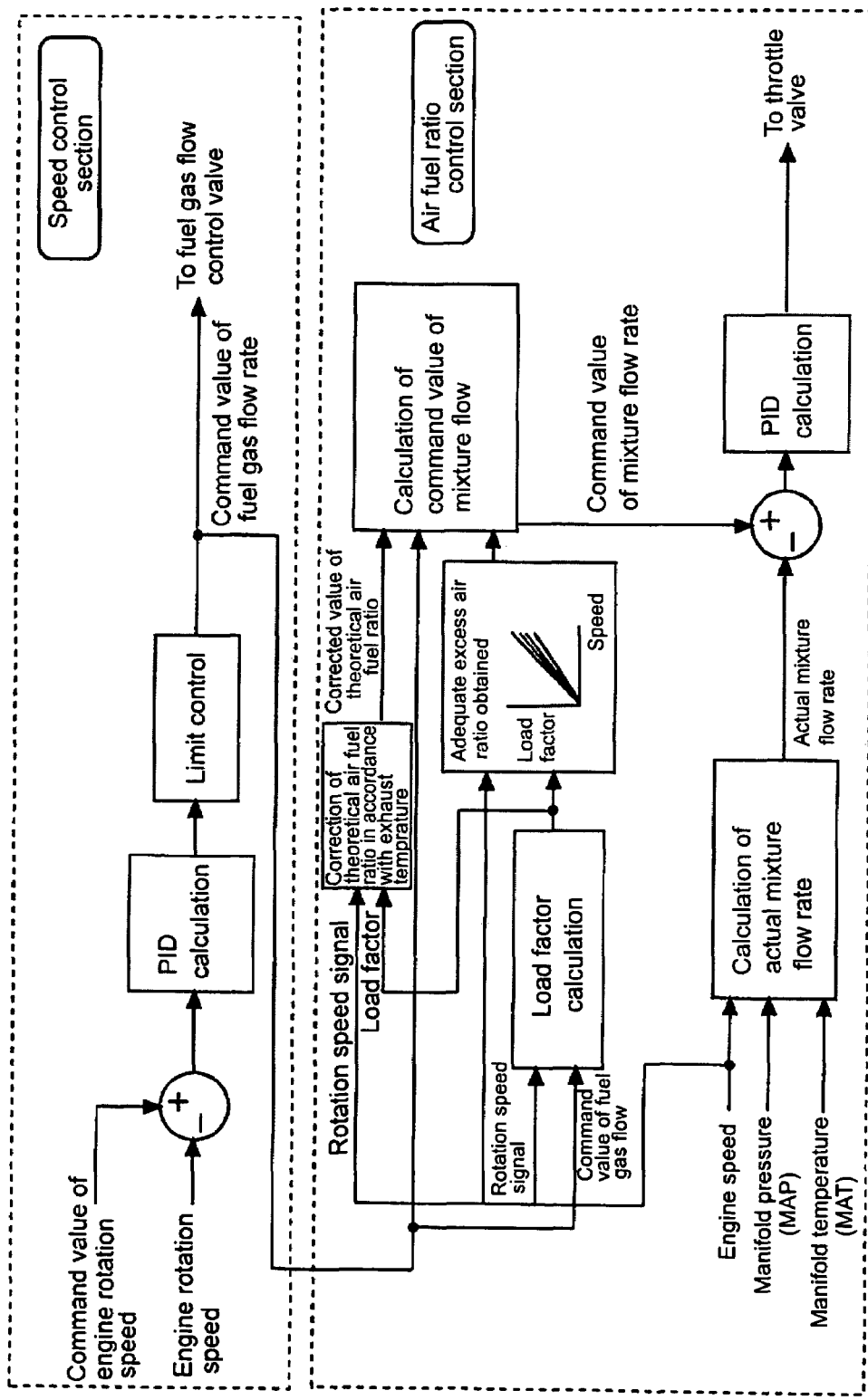
FIG. 2 is a control block diagram of the gas engine of FIG. 1.
Figure 3:
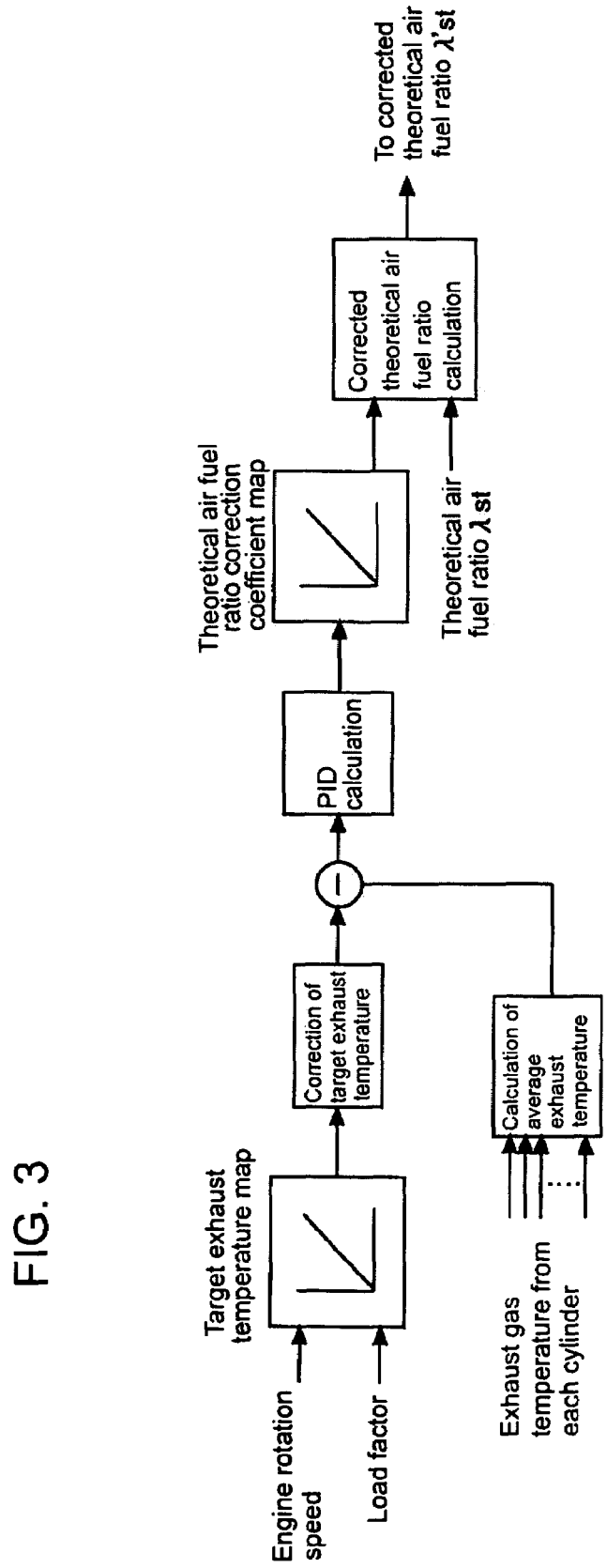
FIG. 3 is a control block diagram of correction process theoretical air fuel ratio in accordance with exhaust temperature.
Figure 7:
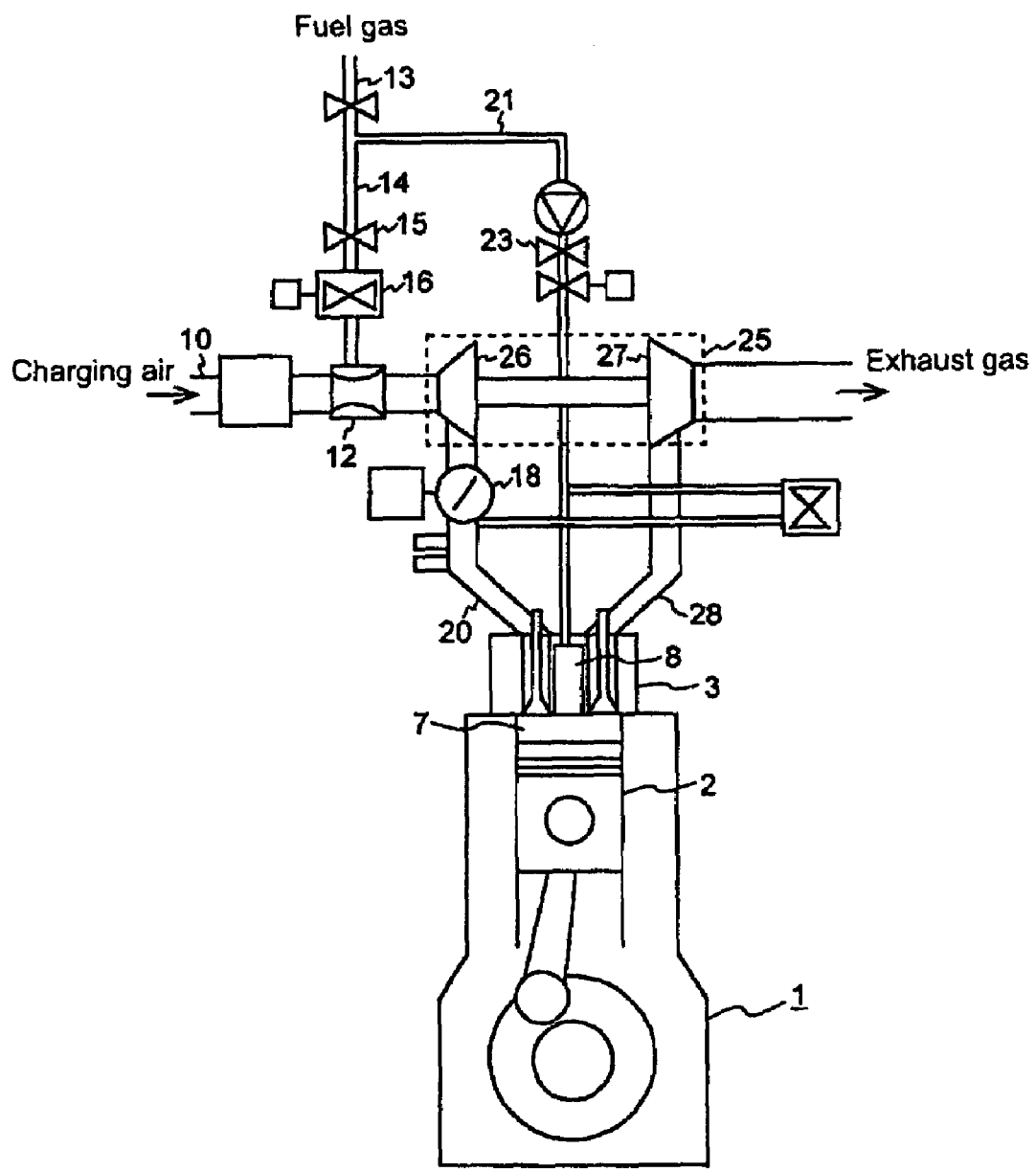
FIG. 7 is an overall configuration of a conventional gas engine.

FIG. 1 is an overall configuration of an embodiment of the control device according to the invention including the gas engine, FIG. 2 is a control block diagram of the gas engine of FIG. 1, FIG. 3 is a control block diagram of correction process of theoretical air fuel ratio in accordance with exhaust temperature, FIG. 4 is a table showing an example of limit fuel gas flow map, FIG. 5 is a table showing an example of limit excess air ratio map, and FIG. 6 is a table showing an example of adequate of excess air ratio map.

Overall configuration of the gas engine equipped with an embodiment of the control device according to the invention will be explained with reference to FIG. 1. In FIG. 1 is shown as an example a turbocharged, lean burn gas engine with subsidiary ignition chamber for driving a generator, however, application of the control device of this embodiment is not limited to the gas engine of FIG. 1, the device is applicable to gas engines other than lean combustion type. Machines driven by the engine are of course not limited to generators.

As shown in the drawing, a gas engine 1 which drives a generator 40 has a mixture supply pipe 20 for supplying a mixture of air and fuel gas to a main combustion chamber 7, and an exhaust pipe 28 for exhausting burnt gas form the main combustion chamber 7. The mixture supply pipe 20 and exhaust pipe 28 are connected to a compressor 26 and a turbine 27 respectively.

The gas engine 1 has a cylinder 2 and a cylinder head 3 mounted on the cylinder, a piston 4 is connected to a crankshaft 5 via a connecting rod 6, and the piston 4 moves up and down in the cylinder 2 as the crankshaft 5 rotates. The main combustion chamber(main chamber) 7 is formed in the cylinder 2 above the piston 4, and a subsidiary chamber 8 connected to the main chamber 7 through a jet hole of the subsidiary chamber 8 is formed in the cylinder head 3.

An air cleaner 11 for filtering removing dust and foreign matter in air and a mixer 12 for mixing air and fuel gas are connected to a charging air supply pipe 10 for supplying charging air to the engine 1. A fuel supply pipe 13 for supplying fuel gas to the engine 1 is branched into a main chamber fuel supply pipe 14 and a subsidiary chamber fuel supply pipe 21. To the main chamber fuel supply pipe 14 are connected a pressure regulator 15 for regulating pressure of fuel gas to be supplied to the main chamber 7 to a prescribed pressure and a main chamber fuel flow control valve (fuel flow metering valve) 16 for controlling fuel gas flow supplied to the main chamber 7. The main chamber fuel flow control valve 16 is a variable opening valve for controlling fluid flow by electronic control and its structure is well known. To the subsidiary chamber fuel supply pipe 21 are connected a compressor 22 for pressurizing fuel gas supplied to the subsidiary chamber 8 and a subsidiary chamber pressure regulator 23 for regulating pressure of the fuel gas to a subscribed pressure, and a pressure difference control valve 24 for controlling pressure difference between the pressure of the fuel gas supplied to the subsidiary chamber 8 and that of the mixture in the mixture supply pipe 20.

The turbocharger 25 comprises a turbine 27 driven by exhaust gas introduced through the exhaust pipe 28, and a compressor 26 connected with a shaft to the turbine 27, which is well known construction.

The gas mixer 12 is connected to the suction port of the compressor 26, and the discharge port of the compressor 26 is connected to the mixture supply pipe 20 for supplying air pressurized by the compressor 26 to the main chamber 7 via inlet ports of the cylinder head 3.

A throttle valve 18 for controlling fuel-air mixture flow supplied to the main chamber 7 is attached to the mixture supply pipe 20. The throttle valve 18 is connected to a governor 19 and mixture flow rate is controlled by controlling the opening of the throttle valve 18. The mixture supply pipe 20 and exhaust pipe 28 respectively has a plurality of branch pipes to be communicated to a plurality of combustion chambers 7 of the multi-cylinder engine 1, although in the drawing is depicted as one pipe respectively for simplification's sake.

In the gas engine 1 composed as described above, charging air sucked through the air supply pipe 10 is introduced to a gas mixer 12, fuel gas is introduced through the fuel gas pipe 13 and 14 to the pressure regulator 15 to be regulated in pressure, then to the fuel gas flow control valve 16 to be controlled in flow rate, and then to the gas mixer 12. The charging air and fuel gas are mixed in the mixer 12 to produce lean fuel-air mixture. The lean mixture is compressed by a compressor 26 of the turbocharger 25, then flows through the throttle valve 18 where flow rate of the mixture is controlled, and then flows through the mixture supply pipe 20 into the main chamber 7 in the suction stroke to be burned there after compressed in compression stroke. On the other hand, a part of the fuel gas is introduced from the fuel gas pipe 13 through the subsidiary fuel gas pipe 21 to the pressure regulator 23 where the fuel gas is regulated in pressure, then the fuel gas is introduced into a subsidiary chamber 8. Pressure of the fuel gas to be supplied to the subsidiary chamber 8 is regulated by the pressure regulator 23 to an appropriate pressure in accordance with engine load based on pressure difference between the pressure of the fuel gas supplied to the subsidiary chamber 8 and that of the mixture in the mixture supply pipe 20 detected by the pressure difference control valve 24. Fuel gas introduced into the subsidiary chamber 8 is ignited by a spark of an ignition plug near the top dead center of the engine cycle. The flame produced by the ignition of the fuel gas in the subsidiary chamber fuel gas jets out to the main chamber 7 to ignite the fuel-air mixture in the main chamber 7, and the mixture is burned in the expansion stroke. The burnt gas is exhausted through exhaust ports in the cylinder head 3 and through the exhaust pipe 28 in the exhaust stroke to be introduced to the turbine 27 of the turbocharger 25.

The gas engine 1 is equipped with a plurality of sensors for detecting engine operating conditions. A MAP sensor 30 for detecting inlet mixture pressure and a MAT sensor 31 for detecting inlet mixture temperature are attached to the mixture supply pipe 20. Also, a rotation speed sensor 32 for detecting rotation speed of the engine, a subsidiary chamber fuel gas pressure sensor 33 for detecting pressure of the fuel gas supplied to the subsidiary chamber 8, a pressure difference sensor 34 for detecting pressure difference between the pressure of the fuel gas supplied to the subsidiary chamber 8 and that of the mixture in the mixture supply pipe 20, an exhaust temperature sensor 35 for detecting exhaust gas temperature, and a torque sensor (not shown in the drawing) for detecting engine output torque are provided.

The generator 40 driven by the gas engine 1 is provided with a control panel 41 for overall controlling of the generator including control of shutoff switch attached to the generator 40.

Operation of the gas engine 1 is controlled by an electronic control unit(ECU)50. The electronic engine control unit 50 is composed as a computer having a CPU, RAM, ROM, etc., and a speed control section 51 having a function of controlling engine rotation speed and an air fuel ratio control section 52 having a function of controlling air fuel ratio are composed by these devices in the control unit. The speed control section 51 and air fuel ratio control section 52 perform coordinated control with each other.

To the electronic control unit 50 are inputted detected signals from the MAP sensor 30, MAT sensor 31, speed sensor 32, etc. and a shutoff signal from the generator control panel 41. The control unit 50 performs a variety of arithmetic processing based on the input signals and sends calculation results as output signals to each of the valves. As output signals can be cited a fuel gas flow command signal, throttle opening control signal, pressure difference control valve opening control signal, etc.

In a case of a gas engine 1 with the subsidiary chamber 8, a pressure difference control section (not shown in the drawing) is provided in the electronic control unit 50, which controls pressure difference between the pressure of the fuel gas supplied to the subsidiary chamber 8 and that of the mixture in the mixture supply pipe 20 by receiving inlet mixture pressure from the MAP sensor 30, fuel gas pressure from the subsidiary chamber fuel gas pressure sensor 33, and pressure difference from the pressure difference sensor 34. The pressure difference control section is provided with a calculation means for calculating one of pressures or pressure difference among the inlet mixture pressure, the fuel gas pressure, and the pressure difference from two of the pressures or pressure difference using a relation between them, viz. (fuel gas pressure supplied to the subsidiary chamber)=(pressure difference between the pressure of the fuel gas supplied to the subsidiary chamber 8 and that of the mixture in the mixture supply pipe 20)−(inlet mixture pressure). In this wise, even if any one of the sensors malfunctions, necessary pressures and pressure difference can be calculated from two pressure signals from normally functioning sensors. Therefore, provision of a plurality of sensors of the same kind to care for a case of occurrence on malfunction of the sensors becomes unnecessary.

In FIG. 2 is shown the control flow in the electronic engine control unit 50. Control process of the electronic control unit 50 mainly consists of a speed control process by the speed control section 51 which controls engine rotation speed by calculating command value of fuel gas flow rate based on deviation of the engine rotation speed detected by the engine speed sensor 32 from a command value of engine rotation speed which is a target value of engine speed and controlling the fuel gas flow control valve 16 so that the fuel gas flows through the valve 16 at the commanded fuel gas flow rate, and an air fuel ratio control process by the air fuel ratio control section 52 which performs feedback control by calculating command value of mixture flow rate so that air fuel ratio of the mixture is appropriate with the command value of fuel gas flow and controlling opening of the throttle valve 18 to a target opening thereof determined based on deviation of actual mixture flow rate calculated using detected engine speed, manifold pressure and manifold temperature from the calculated command value of mixture flow rate.

Control flow in the speed control section will be explained concretely referring to FIG. 2. First, command value of fuel gas flow rate is calculated by PID calculation based on deviation of actual engine speed detected by the engine speed sensor 32 from a command value of engine speed which is targeted speed for rated operation. The command value of engine speed will be changed according to operation condition such as rated speed operation, increasing speed operation, and decreasing speed operation.

Engine speed at no-load running, rated operation, limit speed at increasing operation, decreasing operation is changeable.

Then, limit control is performed to the calculated command value of fuel gas flow rate. In the limit control, a limit range of fuel gas flow including at least an upper limit is set beforehand. When the command value of fuel gas flow rate calculated by the PDI calculation exceeds the upper limit, the command value is corrected so that it in the limit range. The limit range may be set to include an upper limit and a lower limit.

The limit range is set based on specific conditions having physical meaning, for example, following conditions can be thought of as conditions for determining the limit range. Conditions of determining the limit range are not limited to the following conditions.

As a specific example, a method of setting limit ranges based on permissible endurance or ruggedness of the gas engine can be cited. Limit ranges are set as shown in a fuel gas flow limit map of FIG. 3 for example. In the fuel gas flow limit map are used as parameters engine rotation speed and MAP (%)(ratio of manifold pressure to that when the engine is operated at full load) as a substitute of engine load and upper limit values of fuel gas flow are determined before hand for engine rotation speed and MAP(%). An upper limit of fuel gas flow is obtained from the map based on inputted engine speed and MAP(%) signals, and the upper limit of fuel gas flow thus obtained is set as an upper limit for the command value of fuel gas flow calculated by the PID calculation.

According to the method, the gas engine can be operated within the permissible range of its endurance, so occurrence of trouble or abnormal deterioration of the engine can be prevented.

As another specific example, a method of setting limit ranges for air fuel ratio in transient operation of the gas engine 1 can be cited. The limit range of air fuel ratio is preferably set so that excess air ratio is in a range of 0.5-2.2. This range of excess air ratio corresponds to air fuel ratio with which normal combustion is attained.

In this method, excess air ratio of fuel-air mixture with which combustion in the combustion chamber of the gas engine is possible is taken as necessary condition, and limit ranges are set in an excess fuel ratio map as shown in FIG. 4 for example. In the excess air are used as parameters engine rotation speed and PAP(%)(ratio of manifold pressure to that when the engine is operated at full load) as a substitute of engine load and lower limit values of excess air ratio are determined beforehand for engine rotation speed and MAP (%). A lower limit of excess air ratio is obtained from the map based on inputted engine speed and MAP(%) signals, a fuel gas flow rate to correspond with the lower limit value of excess air ratio is calculated, and the fuel gas flow rate thus calculated is set as an upper limit of fuel gas flow. This fuel gas flow rate is set as an upper limit for the command value of fuel gas flow calculated by the PID calculation.

Fuel gas flow rate corresponding with the lower limit value of excess air ratio is calculated from following equation (1)

$$Q_{gas\_limit} = Q_{mix\_act}/(1+\lambda_{st}*\lambda_{lim}) \quad (1),$$

where, $Q_{gas\_limit}$: upper limit of fuel gas flow(l/sec), $Q_{mix\_act}$: actual mixture flow rate(l/sec), $\lambda_{st}$: theoretical air fuel ratio, and $\lambda_{lim}$: excess air ratio obtained from the excess air ratio limit map.

According to the method, fuel gas can be supplied so that air fuel ratio is appropriate, and occurrence of misfire or abnormal combustion can be prevented by performing the limit control like this.

As mentioned above, by performing limit control to the fuel gas flow rate calculated by PID calculation, quantitative limitation of fuel gas supply for various engine operation conditions is made possible and a person who sets limit value can set limit values having physical meaning.

The limit control may be applied at plurality of steps, in such a case the limit control is accommodated to a limit value of the most small limit range. Or a plurality of steps of limit control may be used properly. There are several methods of setting limit ranges based on other conditions such as a method of setting limit ranges based on the performance of the gas engine 1, a method of setting limit ranges based on power generation efficiency of the generator 40, and a method of setting limit ranges based on exhaust emission.

As has been described hitherto, command value of fuel gas flow is calculated based on deviation of engine rotation speed detected by the rotation speed sensor 32 from a command value of engine rotation speed which is a target value of engine speed, a final command value of fuel gas flow rate is calculated with limit control performed as necessary, and fuel gas flow is controlled by the fuel gas flow control valve 16 in the speed control section 51.

Next, control flow in the air fuel ratio control section 52 will be explained.

First, engine load factor is calculated from the following equation (2) based on the command value of fuel gas flow calculated in the speed control section 51 and detected engine speed.

$$LOAD = \frac{Gas}{Gas\_MAX} \times \frac{MAX\_Sp}{Speed} \times 100, \quad (2)$$

where, LOAD: engine load factor(%), Gas: command value of fuel gas flow (l/sec), Gas_MAX: fuel gas flow at maximum output of the engine(l/sec), MAX_Sp: maximum engine rotation speed(min$^{-1}$), Speed: engine rotation speed(min$^{-1}$).

An adequate air fuel ratio is obtained from a map in which adequate air fuel ratios are determined beforehand for a variety of engine load factors and engine rotation speeds using the detected engine speed and the calculated engine load factor, and a command value of mixture flow rate is calculated from the following equation(3) so that excess air ratio of the mixture coincides with the obtained excess air ratio when mixed with the fuel gas flow of the commanded fuel gas flow rate calculated in the speed control section 51.

$$Q_{mix\_ref} = Q_{gas\_ref}(1+\lambda \cdot \lambda_{st}) \quad (3),$$

where, $Q_{mix\_ref}$: command value of mixture flow rate(l/sec), $Q_{gas\_ref}$: command value of fuel gas flow rate(l/sec), $\lambda$: excess air ratio obtained from the adequate excess air ratio map and $\lambda_{st}$: theoretical air fuel ratio.

As an adequate excess air ratio map, a map shown for example in FIG. 6 can be used in which adequate excess air ratios are determined beforehand for a variety of engine load factors and engine rotation speeds. As air fuel ratio and excess air ratio is convertible to each other, excess air ratio in the map may be expressed in air fuel ratio. In using the adequate excess fuel ratio map, fuel gas flow limit map, and excess air ratio limit map, a value corresponding to the value of input signal will be obtained by interpolation when a value of input signal is between values of the parameters in the map.

On the other hand, actual mixture flow rate is calculated based on the detected value of engine speed signal, inlet mixture pressure(MAP signal), and inlet mixture temperature (MAT signal). Required mixture flow rate is calculated by the following equation (4).

$$Q_{mix} = \frac{Speed \times V \times V_e \times MAP \times T_n}{2 \times 60 \times P_n \times MAT} \quad (4)$$

where, $Q_{mix}$: actual mixture flow(l/sec), Speed: engine rotation speed($min^{-1}$), V: total piston swept volume(1), $V_e$: volumetric efficiency, MAP: inlet manifold pressure(kPa), MAT: inlet manifold temperature(K), $T_n$: absolute temperature of 0° C. (273.2K), and $P_n$: absolute pressure of 1 atmospheric pressure(101.31 kPa).

Feedback control is performed to determine target opening of the throttle valve 18 by PID calculation based on deviation of the actual mixture flow rate from the command value of mixture flow rate.

The embodiment is featured in that theoretical air fuel ratio used to calculate command value of mixture flow rate is corrected in accordance with the temperature of exhaust gas from the combustion chamber 7 in the air fuel ratio control section 52.

Fuel gases used for gas engines range over many kinds of gases such as natural gas, propane gas, sludge digestion gas, etc. Calorific value of each of these gases is different depending on their constituents and exerts a significant influence on air fuel ratio control resulting in unstable air fuel control.

According to the embodiment, theoretical air fuel ratio is corrected based on detected exhaust temperature and command value of mixture flow rate is calculated using the corrected theoretical air fuel ratio.

In FIG. 3 is shown a control block diagram of correction process of theoretical air fuel ratio in accordance with exhaust temperature. A target exhaust temperature map in which adequate exhaust gas temperatures are prescribed for various engine rotation speed and load factors is provided for use in the correction process. A target exhaust temperature is obtained from the map in accordance with a detected rotation speed and load factor calculated from the equation (2). PID calculation is done based on deviation of an exhaust gas temperature detected by the exhaust temperature sensor 35 from the target exhaust temperature to convert the deviation to a difference factor of fuel gas composition. Using the difference factor of fuel gas composition, a correction coefficient of theoretical air fuel ratio is obtained from a map in which theoretical air fuel ratio correction coefficients are prescribed for various fuel gas composition factors. A corrected theoretical air fuel ratio is obtained by multiplying the initially set theoretical air fuel ratio by the correction coefficient, and the corrected air fuel ratio is used to calculate the commanded value of mixture flow rate from the equation (2).

By using the corrected theoretical air fuel ratio corrected based on the deviation of the actual exhaust temperature from the target exhaust temperature for the calculation of command value of mixture flow rate, control of air fuel ratio appropriate for fuel gas composition is made possible.

It is preferable that the target exhaust temperature is corrected in accordance with cooling water temperature, mixture inlet temperature, and lube oil temperature.

This is done as follows: maps are provided in each of which reference cooling water temperatures, reference mixture inlet temperatures, and reference lube oil temperatures are determined respectively for various engine rotation speeds and load factors. Correction coefficient of target exhaust temperature is calculated from deviation of the actual temperatures of cooling water, mixture inlet temperature, and lube oil temperature from the reference temperature of each of them respectively obtained from the map by multiplying each of weighting factors pertinent to each of cooling water, mixture inlet, and lube oil temperatures to each of the deviations. Correction amount of target exhaust temperature is obtained by multiplying the correction coefficient to the target exhaust temperature. Corrected target exhaust temperature is obtained by adding the correction amount of target exhaust temperature to the target exhaust temperature.

By correcting in this way the target exhaust temperature obtained from the target exhaust temperature map, corrected target exhaust temperature more consistent with combustion condition of actual fuel gas can be obtained.

Moreover, it is preferable that average temperature of exhaust gas exhausted from each cylinder detected by each of the exhaust temperature sensors 35 is calculated in the correction process of theoretical air fuel ratio in accordance with exhaust temperature. By comparing the exhaust gas temperature from each of the plurality of cylinders with the average exhaust temperature, a cylinder in which misfire is occurring can be discovered. When deviation of exhaust gas temperature of one of the cylinders from the average exhaust gas temperature of all cylinders exceeds a limit value of prescribed in an exhaust temperature difference limit map in which limit values are prescribed for various engine rotation speeds and loads, it is judged that misfire is occurring in the concerned cylinder. This occurs also when exhaust temperature sensor of the concerned cylinder is broken or its connection is broken. In such a case, average exhaust temperature of the cylinders excluding the concerned cylinder is calculated and the correction of theoretical air fuel ratio is performed using the average exhaust temperature excluding the exhaust temperature of the concerned cylinder as detected exhaust temperature.

In this way, even when misfire occurs in any of the cylinders or exhaust temperature of any of the cylinders is not detected, proper correction of theoretical air fuel ratio in accordance with exhaust temperature can be performed.

As has been described above, according to the embodiment, improvement in responsivity to load variation and stable control of the engine can be obtained. Particularly, improvement in responsivity to load change at transient operation such as load application or load rejection can be attained by enabling accurate air fuel ratio control.

Moreover, by composing the device such that the speed control section 51 and air fuel ratio control section 52 are unified in the electronic control unit 50 so that coordinated control of the engine is performed under cooperation of the speed control section 51 and air fuel ratio control section 52, smooth and accurate control of engine operation is made possible without requiring a plurality of expensive control devices. In addition, an expensive exhaust gas sensor is not needed to provide, so significant cost reduction is made possible.

Furthermore, in a case the invention is applied to a gas engine equipped with a turbocharger 25, turbo lag is suppressed to a minimum which contributes to improvement in responsivity.

When applying load, exhaust energy is increased by increasing fuel gas flow in advance by the speed control section 51, rotation speed of the turbocharger 25 increases swiftly to increase charging air flow and control of increasing fuel gas flow can be performed, so responsivity can be further increased.

Furthermore, by performing limit control in the speed control section 51, quantitative limitation of fuel gas flow in various operating conditions is possible, and limit value having physical meaning for the gas engine can be applied as control limits for the engine. That is, by determining limit ranges of fuel gas flow based on permissible endurance or ruggedness of the gas engine 1, operation is controlled in a range of output permissible for the engine from a viewpoint of durability of the engine, so occurrence of trouble or abnormal deterioration of the engine can be prevented. On the other hand, by determining limit ranges of air fuel ratio (excess air ratio), fuel-air mixture of appropriate air fuel ratio can be supplied to the combustion chamber, occurrence of misfire or abnormal combustion can be prevented.

According to the embodiment, correction of theoretical air fuel ratio is performed based on deviation of the actual exhaust temperature from the target exhaust temperature in the air fuel ratio control process, so air fuel ratio can be controlled appropriately even when fuel gas of different calorific value is used, and occurrence of output shortage and inability of starting can be prevented.

Moreover, by discovering a cylinder of which exhaust temperature is abnormal and correcting theoretical air fuel ratio using average exhaust temperature excluding the abnormal exhaust temperature as the actual exhaust temperature, proper correction if theoretical air fuel ratio in accordance with exhaust temperature can be performed even when misfire occurs in any of the cylinders or exhaust temperature of any of the cylinders is not detected.

The integrative control method and device of the invention with which load responsivity is improved with accurate air fuel ratio control maintained can be applied widely to gas engines such as engines for driving generators in normal and emergency service, engines for construction equipment, engines for ships, and engines for railroad vehicles.

The invention claimed is:

1. An integrative control method of a gas engine in which fuel gas is introduced via a fuel gas flow control valve to a charging air supply pipe to be mixed with the air and the mixture is controlled in its flow rate by a throttle valve and supplied to combustion chambers and the gas burnt in the combustion chamber is exhausted through an exhaust pipe of the engine, comprising a speed control process for controlling engine rotation speed by calculating a command value of fuel gas flow rate based on deviation of a detected engine rotation speed from a target command value of engine rotation speed and controlling fuel gas flow rate flowing through the fuel gas flow control valve to coincide with the calculated command value of fuel gas flow rate, and an air fuel ratio control process for controlling air fuel ratio of fuel-air mixture supplied to the combustion chamber of the engine through performing feedback control in which such a command value of fuel-air mixture flow rate is calculated that air fuel ratio of the mixture coincides with an adequate value prescribed for each of detected values of operating conditions of the gas engine with the fuel gas flow flowing at the commanded fuel gas flow rate and a target opening of the throttle valve is determined based on deviation of the actual mixture flow rate calculated based on detected values of operating conditions of the gas engine from the calculated command value of fuel-air mixture flow rate, wherein correction of theoretical air fuel ratio in accordance with exhaust temperature is performed in the air fuel ratio control process, the correction being done to correct the theoretical air fuel ratio used to calculate the command value of fuel-air mixture flow rate in accordance with exhaust temperature based on deviation of actual exhaust temperature from target exhaust temperature prescribed for various engine rotation speeds and load factors.

2. An integrative control method of a gas engine according to claim 1, wherein limit ranges of fuel gas flow rates including at least upper limit of fuel gas flow rates are prescribed based on permissible endurance of the gas engine or limit ranges of excess air ratios including at least lower limit of excess air ratios are prescribed based on permissible air fuel ratio for preventing abnormal combustion for various engine speed and load, and limit control is performed so that the command value of fuel gas flow rate does not exceed the limit range for concerned engine speed and load in the speed control section.

3. An integrative control method of a gas engine according to claim 1, wherein the target exhaust temperature is corrected based on other temperatures such as temperature of cooling water, mixture inlet, and lube oil in the correction process of theoretical fuel air ratio in accordance with exhaust temperature.

4. An integrative control method of a gas engine according to claim 1, wherein average exhaust temperature of all cylinders is calculated, detected temperature of exhaust gas from each cylinder is compared with the average temperature respectively to obtain deviation from the average temperature, and when there is(are) a cylinder(s) of which the deviation exceeds a predetermined threshold value, partial average exhaust temperature is calculated excluding the exhaust temperature(s) from the concerned cylinder(s) to obtain exhaust temperature to be used as the actual exhaust temperature in the correction process of theoretical air fuel ratio in accordance with exhaust temperature.

5. An integrative control device of a gas engine in which fuel gas is introduced via a fuel gas flow control valve to a charging air supply pipe to be mixed with the air and the mixture is controlled in its flow rate by a throttle valve and supplied to combustion chambers of the engine, the engine being equipped with a rotation speed sensor for detecting engine rotation speed, a inlet pressure sensor for detecting inlet mixture pressure, an inlet temperature sensor for detecting inlet mixture temperature, an exhaust temperature sensor for detecting temperature of exhaust gas from the cylinder, and a control device which performs engine control based on input signals from the sensors, wherein the control device comprises a speed control section for controlling engine rotation speed by calculating a command value of fuel gas flow rate based on deviation of a detected engine rotation speed from a target command value of engine rotation speed and controlling fuel gas flow rate flowing through the fuel gas flow control valve to coincide with the calculated command value of fuel gas flow rate, and an air fuel ratio control section for controlling air fuel ratio of fuel-air mixture supplied to the combustion chamber of the engine through performing feedback control in which such a command value of fuel-air mixture flow rate is calculated that air fuel ratio of the mixture coincides with an adequate value prescribed for each of detected values of operating conditions of the gas engine with the fuel gas flow flowing at the commanded fuel gas flow rate and a target opening of the throttle valve is determined based on deviation of the actual mixture flow rate calculated based on detected engine rotation speed, inlet manifold pressure, and inlet manifold temperature from the calculated command value of fuel-air mixture flow rate, wherein a means for correcting theoretical air fuel ratio in accordance with exhaust temperature is provided in the air fuel ratio control section, the correction being done to correct the theoretical air fuel ratio used to calculate the command value of fuel-air mixture flow rate in accordance with exhaust temperature based on deviation of actual exhaust temperature from target exhaust temperature prescribed for various engine rotation speeds and load factors.

6. An integrative control device of a gas engine according to claim 5, wherein the means for correcting theoretical air fuel ratio in accordance with exhaust temperature is provided with a map in which target temperatures are prescribed for various engine rotation speeds and load factors, and target exhaust temperature is obtained from the map in accordance with the detected engine rotation speed and load factor calculated based on the engine rotation speed and command value of fuel gas flow calculated in the speed control section.

7. An integrative control device of a gas engine according to claim 5, wherein limit ranges of fuel gas flow rates including at least upper limit of fuel gas flow rates are prescribed based on permissible endurance of the gas engine or limit ranges of excess air ratios including at least lower limit of excess air ratios are prescribed based on permissible air fuel ratio for preventing abnormal combustion for various engine speed and load, and limit control is performed so that the command value of fuel gas flow rate does not exceed the limit range for concerned engine speed and load in the speed control section.

8. An integrative control device of a gas engine according to claim 5, wherein the means for correcting theoretical air fuel ratio in accordance with exhaust temperature is provided with a means for correcting the target exhaust temperature based on other temperatures such as temperature of cooling water, mixture inlet, and lube oil.

9. An integrative control device of a gas engine according to claim 5, wherein the means for correcting theoretical air fuel ratio in accordance with exhaust temperature is provided with a means for calculating average exhaust temperature of all cylinders, comparing detected temperature of exhaust gas from each cylinder with the average temperature respectively to obtain deviation from the average temperature, and calculating partial average exhaust temperature excluding the exhaust temperature(s) of which the deviation from the average exhaust temperature of all cylinders exceeds a predetermined threshold value, the partial average exhaust temperature being used as the actual exhaust temperature to correct theoretical air fuel ratio in accordance with exhaust temperature.

* * * * *